(12) United States Patent
Choe

(10) Patent No.: US 11,078,022 B1
(45) Date of Patent: Aug. 3, 2021

(54) CONNECTOR BLOCK FOR CONNECTING LINKS IN TROLLEY CHAIN

(71) Applicant: KOREA WHEEL CORPORATION, Ansan-si (KR)

(72) Inventor: Hun Choe, Boryeong-si (KR)

(73) Assignee: KOREA WHEEL CORPORATION, Ansan-si (KR)

( * ) Notice: Subject to any disclaimer, the term of this patent is extended or adjusted under 35 U.S.C. 154(b) by 0 days.

(21) Appl. No.: 17/161,151

(22) Filed: Jan. 28, 2021

(51) Int. Cl.
*B65G 17/20* (2006.01)
*B65G 17/38* (2006.01)
*B65G 17/06* (2006.01)

(52) U.S. Cl.
CPC ........... *B65G 17/20* (2013.01); *B65G 17/066* (2013.01); *B65G 17/385* (2013.01)

(58) Field of Classification Search
CPC .. B65G 17/067; B65G 17/068; B65G 17/065; B65G 17/066; B65G 17/30; B65G 17/385
See application file for complete search history.

(56) References Cited

U.S. PATENT DOCUMENTS

| | | | |
|---|---|---|---|
| 3,074,356 A | | 1/1963 | Parker et al. |
| 3,590,745 A | * | 7/1971 | Ouska ...................... B66B 23/10 104/172.3 |
| 3,762,535 A | * | 10/1973 | Becker ................. B65G 17/385 198/716 |
| 6,125,991 A | * | 10/2000 | Veldkamp ............ A22C 15/001 198/678.1 |
| 6,386,355 B1 | * | 5/2002 | Willems ................ B65G 17/061 198/831 |
| 2004/0084288 A1 | * | 5/2004 | Ashida ................. B65G 17/385 198/852 |
| 2013/0284569 A1 | * | 10/2013 | Studer .................. B65G 17/066 198/850 |
| 2021/0127596 A1 | * | 5/2021 | Kim ........................ A01G 9/241 |

FOREIGN PATENT DOCUMENTS

| | | | | |
|---|---|---|---|---|
| GB | 1076820 A | * | 7/1967 | ............. F16G 13/12 |
| KR | 10-2076084 | | 5/2020 | |
| WO | WO 2020/054958 A1 | | 3/2020 | |

OTHER PUBLICATIONS

International Search Report, PCT/KR2019/008581, dated Oct. 18, 2019 (4 pages).

* cited by examiner

*Primary Examiner* — Mark A Deuble
(74) *Attorney, Agent, or Firm* — R. Reams Goodloe, Jr.

(57) ABSTRACT

A connector block for connection between first chain units and second chain units which alternately form portions of a conveyor chain. The connector block is provided using a first block body and a second block body each formed into a U-shaped metal plate. Each block body includes a base plate and side plates, and tabs formed at distal ends of side plates. Tabs are configured for interfitting placement in depressions formed in the base plate of the opposing block body. Side plates of the first block body and side plates of the second block body, are sized, shaped, and joined in secure interlocking engagement, and wherein the first tab receiving depressions each securely position therein a second tab bent for interfitting engagement therewith, and wherein the second tab receiving depressions each securely position therein a first tab bent for interfitting engagement therewith. All side plates further include holes defined by edge walls, for secure engagement with a pivot pin for connection with a first chain unit or a second chain unit.

9 Claims, 3 Drawing Sheets

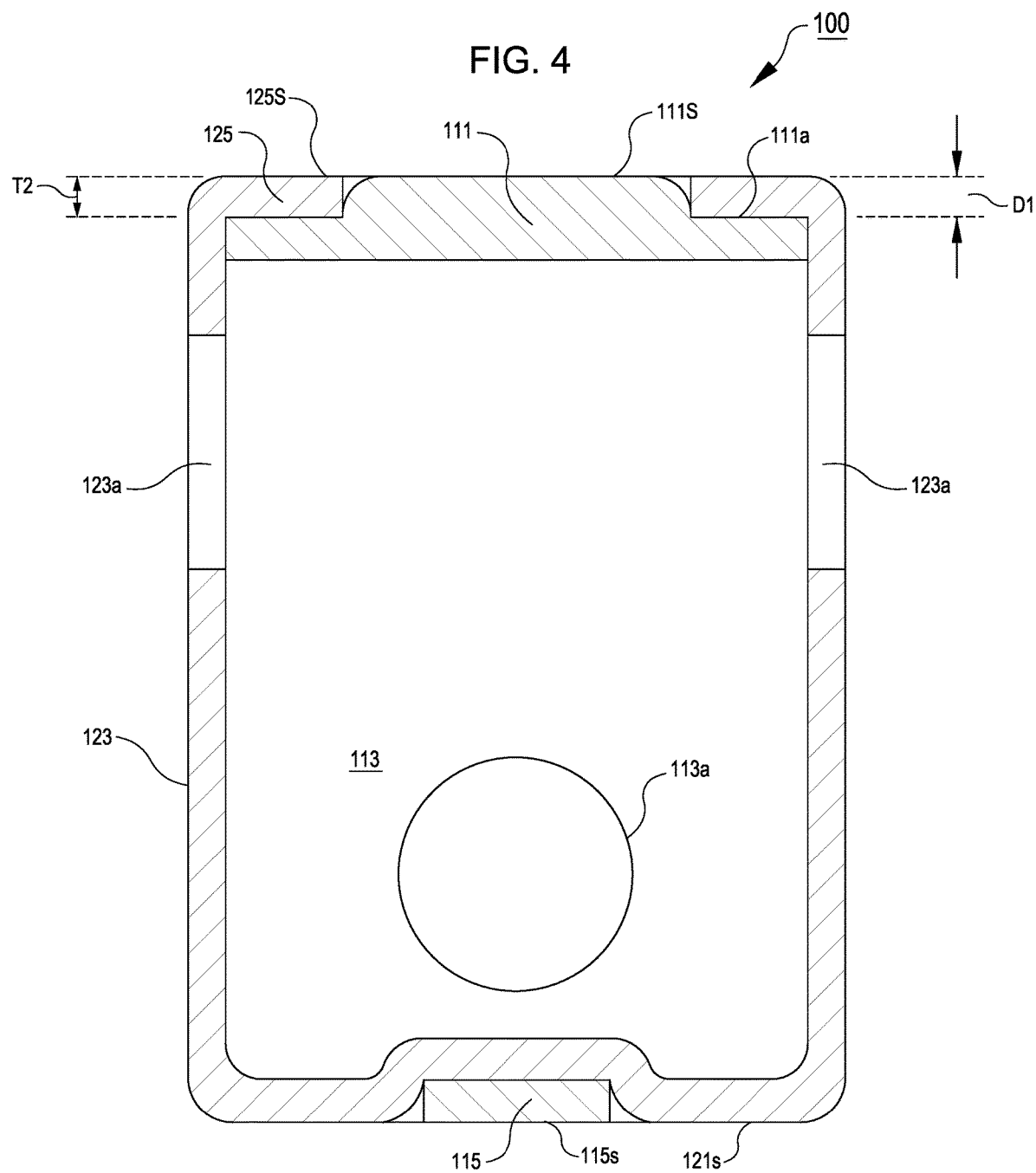

US 11,078,022 B1

CONNECTOR BLOCK FOR CONNECTING LINKS IN TROLLEY CHAIN

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever

RELATED PATENT APPLICATIONS

NONE

TECHNICAL FIELD

This document is directed to structures for flexibly connecting links in the chain of a trolley conveyor, and more particularly, to a joint block or connector block for connection of individual elements in a chain for trolley conveyors.

BACKGROUND

Trolley conveyors are well known, and are often used to hang and transport objects from a continuous support chain that moves within a mounting track. In some trolley conveyor designs, a trolley chain is formed by connecting a series of chain units each to the other and each of which usually include rollers, in order to enable the trolley chain to move smoothly inside the track. An example of a prior art trolley chain including a first chain unit and a second chain unit is depicted in FIG. 1, which is an exploded perspective view showing use of a joint block 10 to connect the first chain unit with the second chain unit.

As shown in FIG. 1, the first chain unit 20 includes vertical rollers V, and a second chain unit 30 includes a horizontal roller H. First chain unit 20 and second chain units 30 are flexibly coupled together using joint block 10. In that design of joint block 10, a vertical insertion hole 11 and a horizontal insertion hole 13 are respectively formed orthogonally in joint block 10. A horizontal pivot pin 23 is used to connect the joint block 10 and the first chain unit 20 at connection hole 21 in link element 25A (and, not shown, in a similar hole in link 25B on the other side) in first chain unit 20. A vertical pivot pin 33 is used to connect the joint block 10 at connection holes 31A and 31B in link elements 35A and 35B in the second chain unit 30. Such conventional joint blocks 10 have been manufactured by drilling joint block 10 to install two holes therein. And pivot pins 23 and 33 have been formed by cutting a metal rod to a desired length, and inserting the pivot pins 23 and 33 much like rivets, and thus forming heads on the impact or head end thereof, while installing the pins 23 and 33 into the vertical insertion hole 11 and the horizontal insertion hole 13, respectively. However, since it is not easy drill the required holes in joint block 10, or to cut rod portions for the pivot pins 23 and 33, or to install the pivot pins 23 and 33, the cost of producing the required parts is high. Thus, there remains a need for an improved design for a connector block, and for an improved method for installation of a connector block between a first chain unit and a second chain unit.

Some Objects, Advantages, and Novel Features

An object of the invention(s) disclosed herein is to solve the above-described problem expensive component costs for trolley conveyor systems, by providing a new connector block design that uses lower cost materials.

An object of the invention(s) disclosed herein is to solve the above-described problem of excessive component costs, by providing a new connector block design that dramatically reduces labor costs for fabrication, yet can still be implemented to reliably perform the same function in a trolley conveyor system.

It is an advantage of the invention(s) disclosed herein that the cost of manufacturing a connector block for a trolley chain is significantly reduced, as compared to prior art connector block designs.

It is an advantage of the invention(s) disclosed herein that the reliability of the connector blocks built according to the designs disclosed herein are nevertheless reliable for operations in facilities which use trolley conveyors.

The above objects and various advantages of the invention(s) as disclosed herein will become more apparent from the description provided and details of various embodiments, as will be understood by those skilled in the art.

SUMMARY

An improved connector block design for a trolley conveyor design has been developed and is described herein. A connector block is provided which is formed by fitting together a pair of U-shaped connector block bodies. The pair of U-shaped connector block bodies are rotated along a common longitudinal axis to a ninety (90°) degree juxtaposition, then inserted each into the other. The U-shaped connector blocks are secured each to the other with opposing tabs that extend distally from first and second side plates of a first connector block body, and from third and fourth side plates of a second connector block body. Tab accepting depressions are provided in a first base pate in the first block body, and in the second base plate in the second block body. Tabs are provided in a thickness matching the depth of the tab accepting depressions, and a secure smooth even surface is provided on the first base plate and in the second base plate, after fabrication is complete, when the tabs have been bent into the secure, fully assembled position. The connector block body is thus hollow, and therefore requires less material than prior art solid joint blocks. First insertion holes are installed in first and second side plates in the first connector block body. Second insertion holes are installed in the third and fourth side plates in the second connector body. The first and second insertion holes are longitudinally spaced apart and orthogonally positioned, to movement in two directions, i.e. up and down and side-to-side, between a first chain unit and a second chain unit that form a first chain portion in a trolley chain. The connector blocks can also be used to join sequentially repeating first chain portions that are used to construct an endless trolley chain. At manufacturing costs as at the time of filing of this disclosure, a per part cost savings in the range of from about US$0.15 to about US$0.40, or more, may be possible, which is a significant savings in the cost of large trolley conveyor systems.

BRIEF DESCRIPTION OF THE DRAWING

The present invention(s) are described herein by way of exemplary embodiments, using for illustration the accom

FIG. 4 is a cross-sectional view showing a cross-section configuration of a pivot joint, taken along line 4-4 of FIG. 2.

Figure 1:
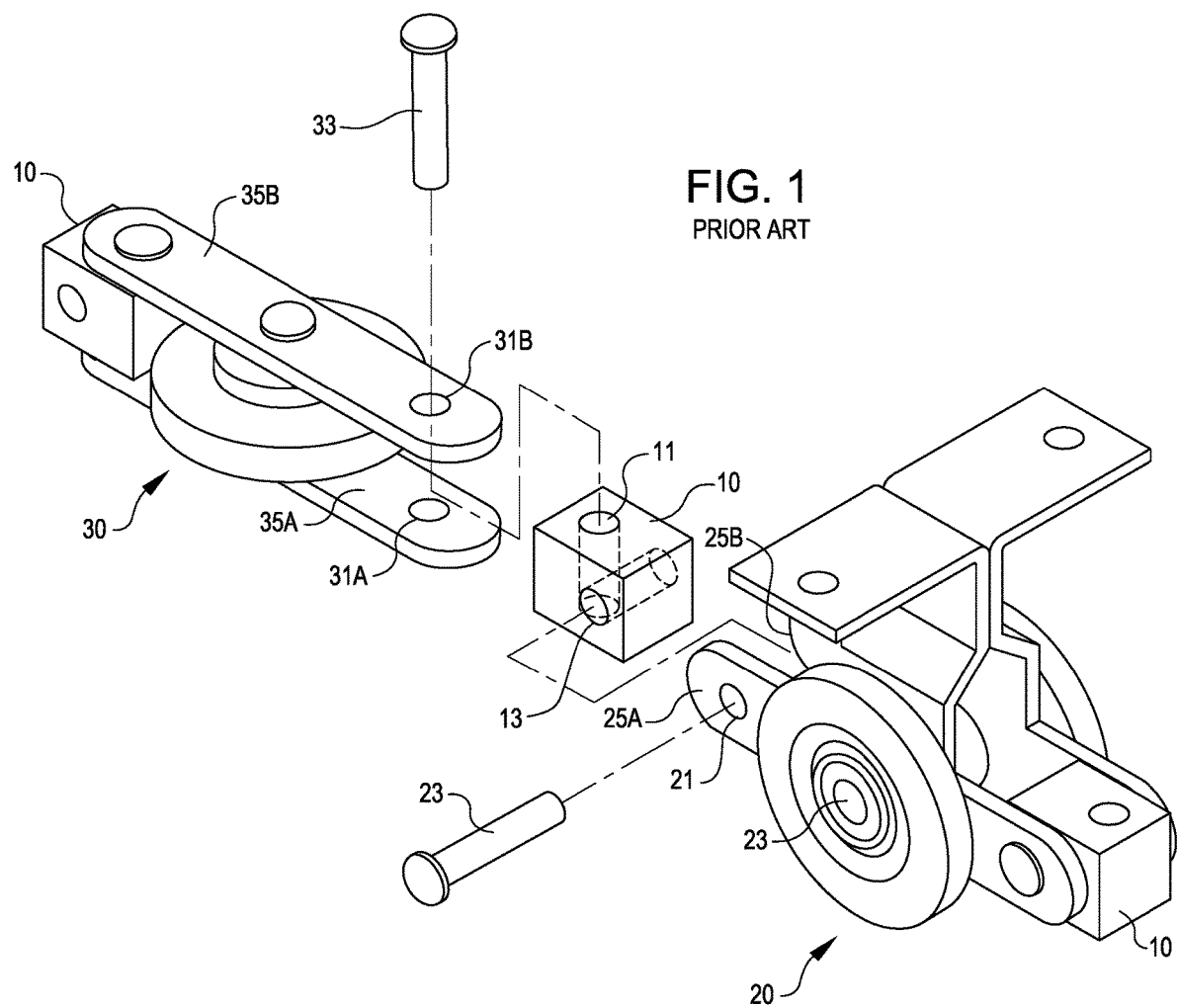
- FIG. 1 is an exemplary perspective view of a conventional prior art trolley conveyor chain design, showing how a joint block in the form of an intermediate pivot block is used to connect a first chain unit with vertical wheels and a second chain unit with a horizontal wheel, which when joined together at the intermediate pivot block, provide a chain portion for repeated sequential use to form an endless trolley conveyor chain.

The foregoing figures, being merely exemplary, contain various elements that may be present or omitted from a particular final configuration for an embodiment of a pivot joint for a trolley system. However, there is no intention to limit the claimed invention to dimensional data, and any suggestion provided by any of the drawing figures of this specification are exemplary rather than mandatory. Thus, the pivot joint and components used therein may be provided sized up or down from any dimensions depicted, without affecting the scope of the appended claims. An attempt has been made to draw the figures in a way that illustrates at least those elements that are significant for an understanding of exemplary pivot joint for a trolley system, and particulars may be varied for specific situations.

It should be understood that various features may be utilized in accord with the teachings hereof, as may be useful in different embodiments, depending upon the specific requirements such as spacing between stationary track members of runs of a trolley conveyor system, all within the scope and coverage of the teachings herein as defined by the claims. Further, like features in various embodiments for a pivot joint for use in a trolley conveyor system may be described using like reference numerals, or other like references, without further mention thereof.

DETAILED DESCRIPTION

Figure 2:
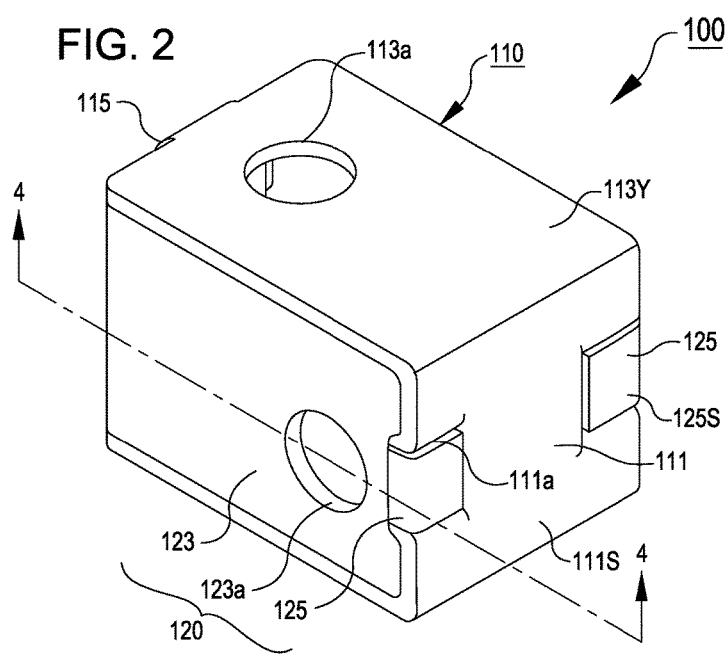
FIG. 2 is a perspective view illustrating a configuration for a joint block for connecting a first chain unit and a second chain unit in trolley chain, where the joint block has an improved design for use in a trolley conveyor system, and in particular, illustrating some of the design features that reduce manufacturing costs through ease of fabrication.

Attention is directed to FIG. 2, where an exemplary design for a connector block 100 is provided. The connector block 100 may be used for joining a first chain unit 20 and a second chain unit 30, in place of the prior art joint block 10 as noted in the above discussion with respect to FIG. 1. Thus, the trolley chain connector block 100 is configured for use in flexibly connecting a first chain unit 20 to a second chain unit 30 in a trolley conveyor chain. The connection block 10 may also be used to connect a first chain portion (the combination of first chain unit 20 and second chain unit 30) with repeated chain portions to form an endless trolley chain.

In an embodiment, a first block body 110 and a second block body 120 are each formed by bending a metal plate in an extended "C" or "U shape. Then, the first block body 110 and the second block body 120 are securely joined together. For fabrication, the open ends of the first block body 110 and the second block body 120 are faced toward each other along a common longitudinal axis, and rotated to a position ninety (90°) degrees apart with respect each to the other, and then brought together to form an interlocking hollow structure. Thus, as shown, the connector block 100 for use in connecting a first chain unit 20 and a second chain unit 30 may be formed by engaging a pair of block bodies 110 and 120 when rotated ninety (90°) degrees with respect to each other along a common longitudinal axis, so that their complementary U-shapes are sized for interfitting, secure interlocking engagement.

The first block body 110 and the second block body 120 are each formed by first cutting a flat metal plate having a suitable thickness, such as by using a press machine. At this stage of fabrication, it may be advantageous to install in first block body 110 insertion holes H1 defined by edge walls 113a. At this stage of fabrication, it may also be advantageous to install in second block body 120 insertion holes H2 defined by edge walls 123a. Holes H1 and H2 may be used to install a rivet or other pivot pin (neither shown) in the connection block, so that two directional motion may be achieved (up-down and left-right) between a first chain unit 20 and a second chain unit 30.

Next, the flat metal plates to be used for the first block body 110 and for the second block body 120 are further manufactured by bending to form U-shapes, to provide a pair side plates for each block body in each of first block body 110 and second block body 120. More specifically, the first block body 110 is provided as a generally U-shaped metal plate having a first base plate 111 with open edges, a first side plate 113X, and a second side plate 113Y. The first side plate 113X and second side plate 113Y of the first block body 110 each have an outer width W1. In this way, a first insertion space 117 into which the second block body 120 is inserted is formed between the first side plate 113X and the second side plate 113Y. The first side plate 113X and the second side plate 113Y are spaced apart by an interior width W2. The first base plate 111 further includes, along the open edges, first tab receiving depressions 111a. The first side plate 113X and the second side plate 113Y each further includes a distally extending first tab 115. In an embodiment, first tabs 115 may be rectangular in shape.

Likewise, the second block body 120 is provided as a generally U-shaped metal plate having a first base plate 121 with open edges, a third side plate 123X, and a fourth side plate 123Y. The third side plate 123X and fourth side plate 123Y of the second block body 120 each have an outer width W4. The third side plate 123X and the fourth side plate 123Y are spaced apart by an interior width W3. In this way, a second insertion space 127 into which the first block body 110 is inserted is formed between the third side plate 123X and the fourth side plate 123Y. The second base plate 123 further includes, along the open edges, second tab receiving depressions 121a. The third side plate 123X and the fourth side plate 123Y each further includes a distally extending second tabs 125. In an embodiment, second tabs 125 may be rectangular in shape.

Figure 3:
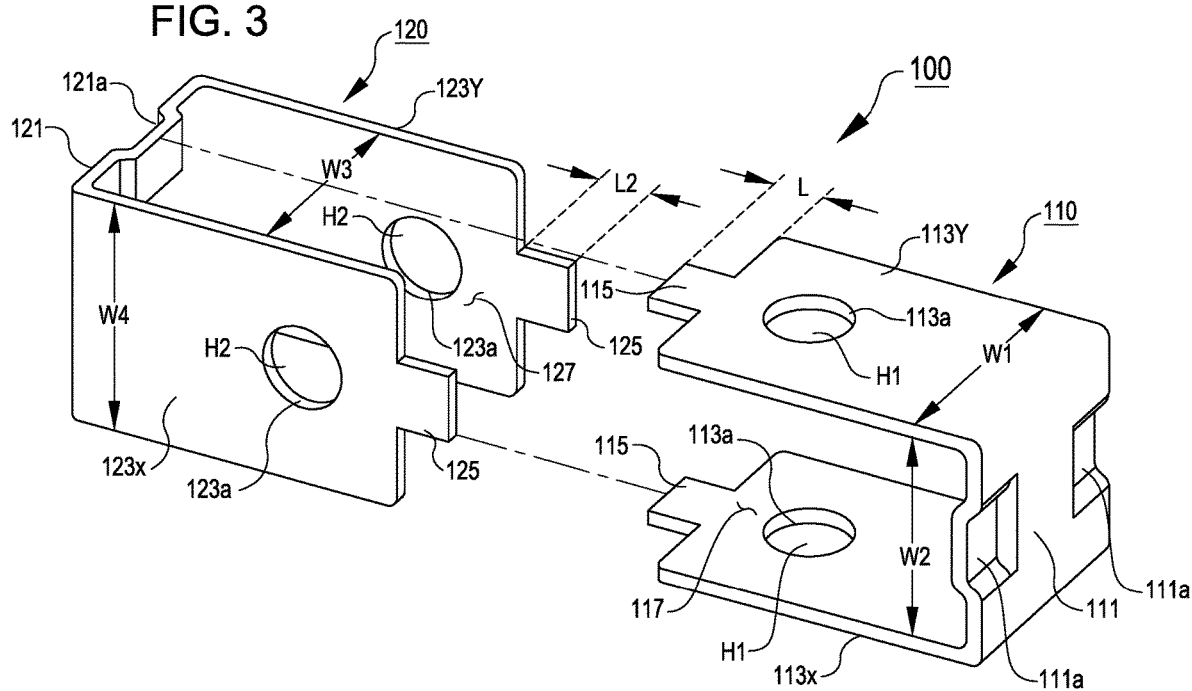
FIG. 3 is a an exploded perspective view of components of the joint block just illustrated in FIG. 2 above, where the joint block has an improved design for use in a trolley conveyor system, and in particular, illustrating some of the design features using machined plate components that reduces manufacturing costs through ease of fabrication.

The first block body 110 is bent on both sides of the first base plate 111 and thus the first base plate 111 forms an end of a rectangular parallelepiped as shown in FIG. 3 of connector block 100. First side plate 113X and second side plate 113Y provide two sides of a rectangular parallelepiped as shown in FIG. 3. Similarly the second block body 120 is bent on both sides of the second base plate 121 and thus the second base plate 121 forms an end of a rectangular parallelepiped as shown in FIG. 3, of connector block 100. Third side plate 123X and fourth side plate 123Y provide two sides of a rectangular parallelepiped as shown in FIG. 3.

As shown in FIG. 4, the first tab receiving depressions 111a in first block body 110 have a depth D1. The second tabs 125 in second block body 120 have a thickness T2. In an embodiment, the thickness T2 of the second tabs is equal to depression depth D1, so that an outer surface 125S of second tabs 125 is even with an outer surface 111S of the first base plate 111.

Similar to the construction just described (but not shown in FIG. 4), the second tab receiving depressions 121a in second block body 120 have a depth D2. The first tabs 115 in first block body 110 has a thickness T1. In an embodiment, the thickness T1 of the first tabs is equal to depression depth D2, so that an outer surface 115S of first tabs 115 is even with an outer surface 121S of the second base plate 121. For best results, an outer surface 115S of tabs 115 when bent and in place on second block body 120, is flush with the outer surface 121S of second block body 120, as can be appreciated from FIG. 4. Similarly, an outer surface 125S of second tabs 125 when bent and in place on first block body 110, is flush with the outer surface 111S of first block body 110, as also can be appreciated from FIG. 4. The just described flush fitting is advantageous since uneven surfaces may cause interference with link elements 25A and or 25B of the first chain unit 20, or with link elements 35A and 35B in the second chain unit 30, as may occur depending on the orientation of first block body 110 as used to join first chain unit 20 and second chain unit 30. Thus, flush surfaces as described above may assure that such interference in operation of the connector block 100 to provide flexibility between first chain unit 20 and second chain unit 30 is avoided.

For secure construction, the gap W2 between the first side plate 113X and the second side plate 113Y of the first block body 110 is the same as the width W4 of the third side plate 123X and the fourth side plate 123Y of the second block body 120, so that the first block body 110 and the second block body 120 are securely engaged in an interlocking relationship when brought together and secured with first tabs 115 and second tabs 125 bent in a final, fully fabricated condition. Likewise, to complete fabrication, for secure construction, the gap W3 between the third side plate 123X and the fourth side plate 123Y of the second block body 120 is the same as the width W1 of the first side plate 113X and the second side plate 113Y of the first block body 110, so that the first block body 110 and the second block body 120 are securely engaged in an interlocking relationship when brought together and secured with first tabs 115 and second tabs 125 bent in a final, fully fabricated condition. In an embodiment, the first block body 110 and the second block body 120 may be identical in size and shape.

In various embodiments, first tabs 115 may have a length L of from about one third (⅓) to one quarter (¼) of width W1 of the first block body 110. In various embodiments, second tabs 125 may have a length L2 of from about one third (⅓) to one quarter (¼) of width W4 of the second block body 120. While there may be some variability in the length L of first tabs 115 and second tabs 125, durability is generally increased with use of longer tab lengths.

Insertion holes H1 (defined by edge walls 113a, for use with pins or rivets or the like) are formed in the extending prongs of first side plate 113X and of second side plate 113Y of first base plate 111. Insertion holes H2 (defined by edge walls 123a, for use with rivets or pins or the like) are formed in the extending prongs of third side plate 123X and of fourth side plate 123Y of base plate 121.

The first block body 110 and the second block body 120 may be formed by cutting them in the same shape using a press machine, drilling the required insertion holes H1 in first block body 110 and H2 in second block body 120 (or drilling and then cutting), and then bending the first block body 110 and the second block body 120 into a U-shape for secure interlocking engagement, to form rectangular parallelepiped shaped connector block 100. In an embodiment, the process of bending of the first tab 115 and the second tab 125 may be performed simultaneously using a bending jig (not shown). Additionally, the assembled chain connector block 100 may be heat treated to improve strength. In this manner, the assembly of the chain connector block 100, as shown in FIG. 2, may be easily completed. Consequently, an advantageous embodiment for a chain connector block 100 is provided to join a first chain portion 20 to a second chain portion 30, so as to allow vertical movement as well as horizontal movement between a first chain portion 110 and a second chain portion 30.

The simple manufacturing process as just described provides a significant savings, as the connector block 100 as described herein may be formed at a production cost, at time of filing of this document, in the range of from about thirty six to forty one cents, in U.S. currency, compared to the price for a conventional prior art block production costs in the range of from about sixty four to about seventy three cents, in U.S. currency.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the joint connector block details as described herein may be useful in reducing costs of a trolley conveyor system, and as such may be modified from those embodiments provided herein, without materially departing from the novel teachings and advantages provided.

The aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A trolley chain connector block, the connector block configured for use in flexibly connecting a first chain unit to a second chain unit in a trolley conveyor chain, the connector block comprising:

a first block body and a second block body, the first block body comprising a generally U shaped metal plate having a first base plate with open edges, a first side plate, and a second side plate, the first side plate and second side plate of the first block body each having an outer width W1 and an interior width W2, the first base plate further comprising, along the open edges, first tab receiving depressions, and wherein the first side plate and the second side plate each further comprises a distally extending first tab;

the second block body comprising a generally U shaped metal plate having a second base plate, a third side plate, a fourth side plate, the third side plate and fourth side plate of the second block body each having an outer width W4 and an interior width W3, the second base plate further comprising, along the open edges, second tab receiving depressions, and wherein the third side plate and the fourth side plate each further comprises a distally extending second tab;

wherein the first side plate and second side plate of the first block body, and the third side plate and fourth side plate of the second block body, are sized, shaped, and joined in secure interlocking engagement, and wherein the first tab receiving depressions each securely position therein a second tab bent for interfitting engagement therewith, and wherein the second tab receiving depressions each securely position therein a first tab bent for interfitting engagement therewith, and wherein the first side plate and second side plate each further comprise a first insertion hole defined by edge walls, and wherein the third side plate and the fourth side plate each further comprise a second insertion hole defined by edge walls.

2. A trolley chain connector block as set forth in claim 1, wherein the first tab receiving depressions have a depth D1, and wherein second tabs have a thickness T2, and wherein the thickness T2 of the second tab is equal to depression depth D1, so that an outer surface of the second tab is even with an outer surface of the first base plate.

3. A trolley chain connector block as set forth in claim 1, wherein the second tab receiving depressions have a depth D2, and wherein first tabs have a thickness T1, and wherein the thickness T1 of the first tab is equal to depression depth D2, so that an outer surface of the first tab is even with an outer surface of the second base plate.

4. A trolley chain connector block as set forth in claim 1, wherein the interior width W2 between the first side plate and the second side plate of the first block body is the same as the width W4 of the third side plate and the fourth side plate of the second block body, so that the first block body and the second block body are securely engaged in an interlocking relationship.

5. A trolley chain connector block as set forth in claim 1, wherein the interior width W3 between the third side plate and the fourth side plate of the second block body is the same as the width W1 of the first side plate and the second side plate of the first block body, so that the first block body and the second block body are securely engaged in an interlocking relationship.

6. A trolley chain connector block as set forth in claim 1, wherein any one or more of the first side plate, the second side plate, the third side plate, and the fourth side plate is parallelepiped in shape as assembled.

7. A trolley chain connector block as set forth in claim 1, wherein the first tab has a length of from about one third (⅓) to one quarter (¼) of width W1 of the first block body.

8. A trolley chain connector block as set forth in claim 1, wherein the second tab has a length of from about one third (⅓) to one quarter (¼) of width W4 of the second block body.

9. A trolley chain connector block as set forth in claim 1, wherein the first block body and the second block body are identical in size and shape.

\* \* \* \* \*

UNITED STATES PATENT AND TRADEMARK OFFICE
CERTIFICATE OF CORRECTION

PATENT NO. : 11,078,022 B1
APPLICATION NO. : 17/161151
DATED : August 3, 2021
INVENTOR(S) : Hun Choe It is certified that error appears in the above-identified patent and that said Letters Patent is hereby corrected as shown below:

In the Specification

Column 1, Line 16, after the word "whatsoever", insert --.--.

Column 1, Line 63, after the words "it is not easy", insert --to--.

Column 2, Line 7, after the words "above-described problem", insert --of--.

Column 2, Line 40, after the words "first base", delete "pate" and insert --plate--.

Column 3, Line 60, after the words "conveyor chain. The", delete "connection block 10" and insert --connector block 100--.

Column 4, Line 23, delete "connection block" and insert --connector block 100--.

Column 6, Line 20, after the words "between a first chain portion", delete "110" and insert --20--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*